July 22, 1952    J. I. D. WARRINGTON    2,604,059
BAKER'S AND LIKE OVEN
Filed May 31, 1949    6 Sheets-Sheet 1
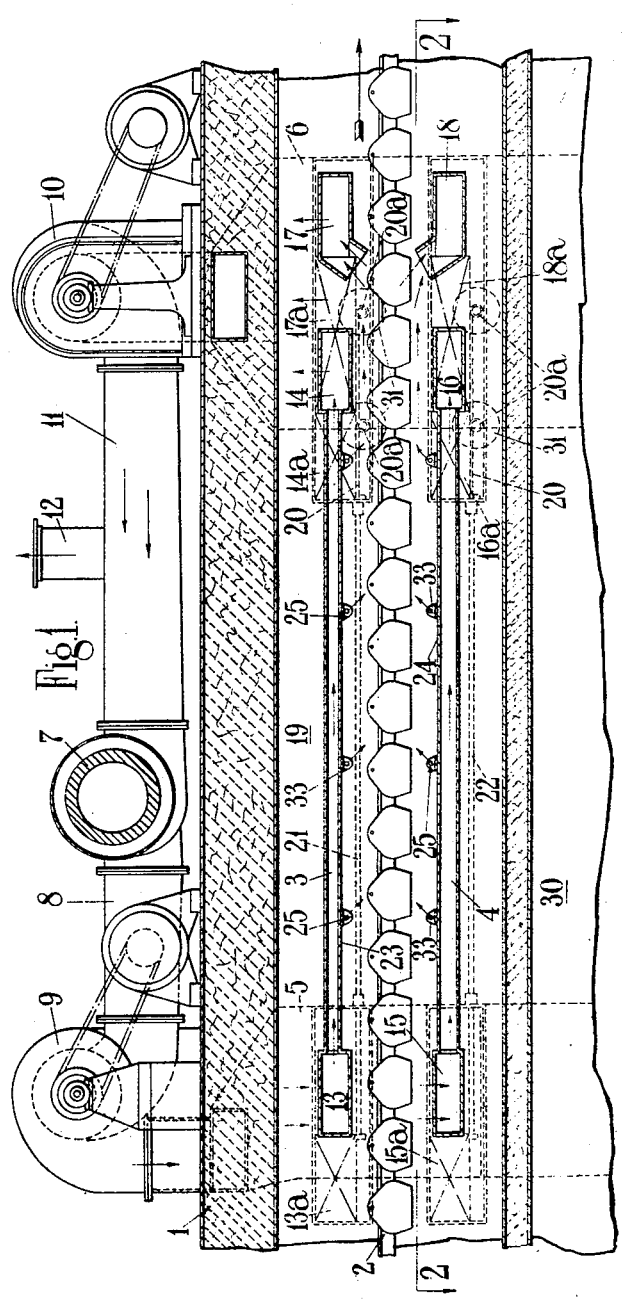
JAMES IRVINE DUDLEY WARRINGTON
INVENTOR.
BY George B. Willcox
ATTORNEY.

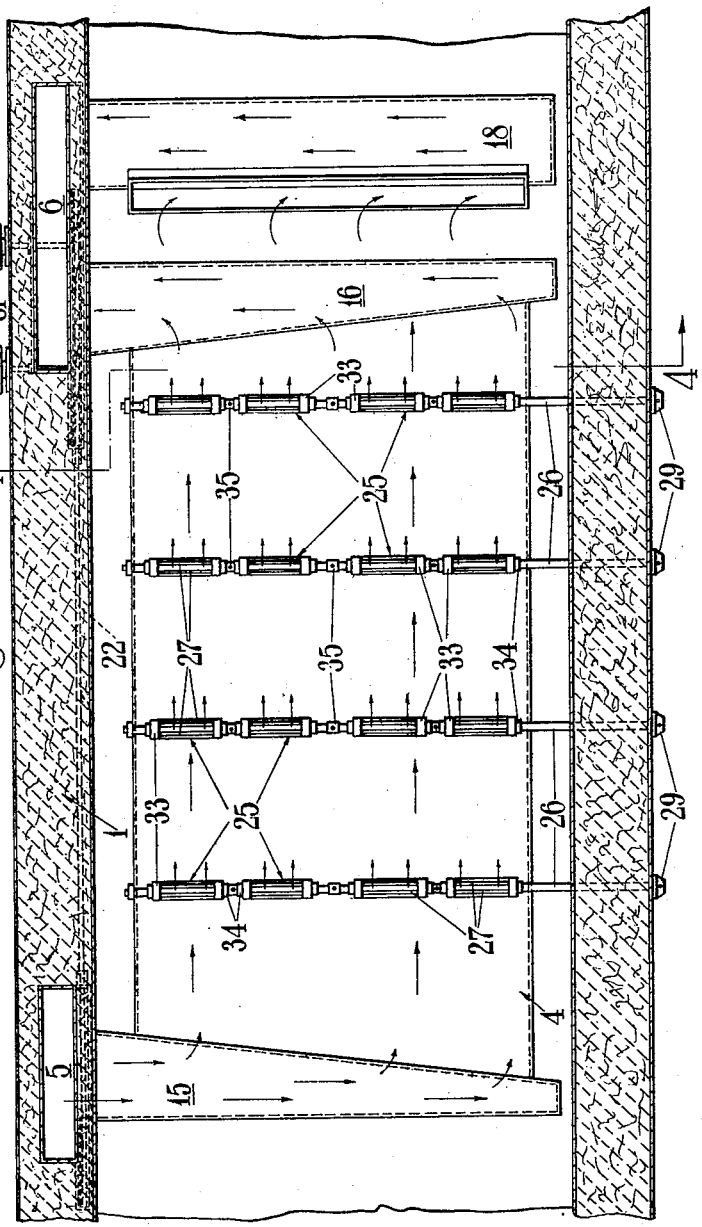

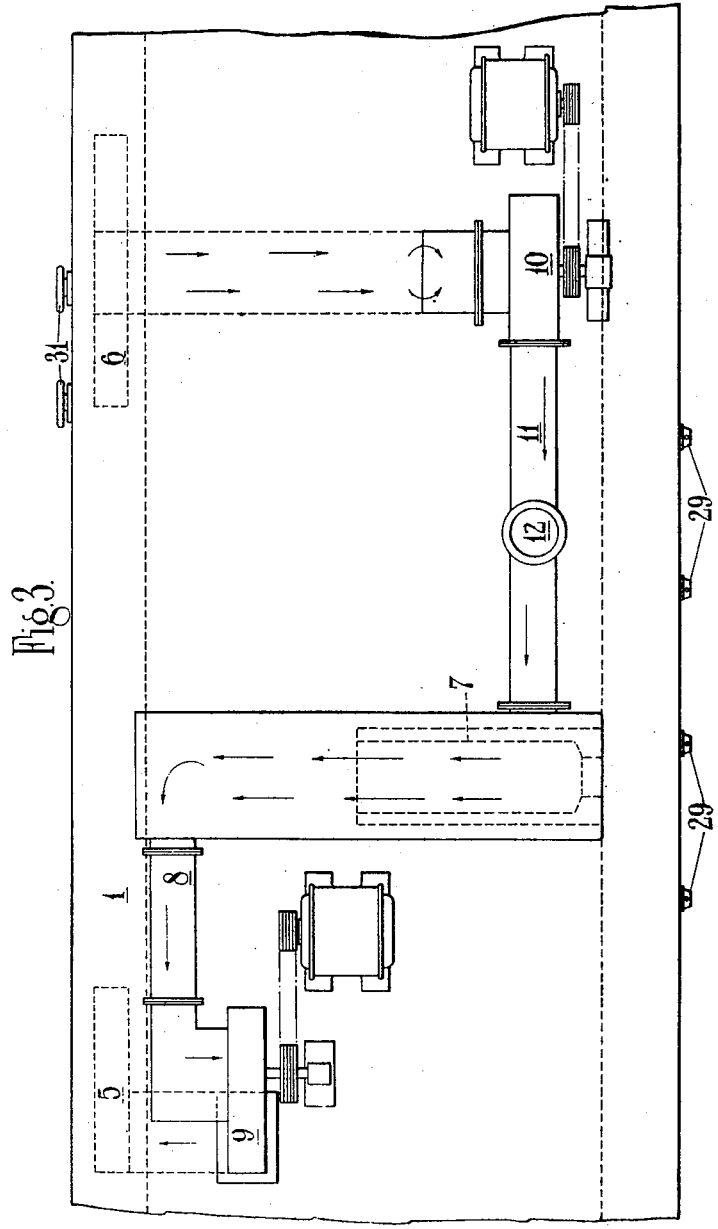

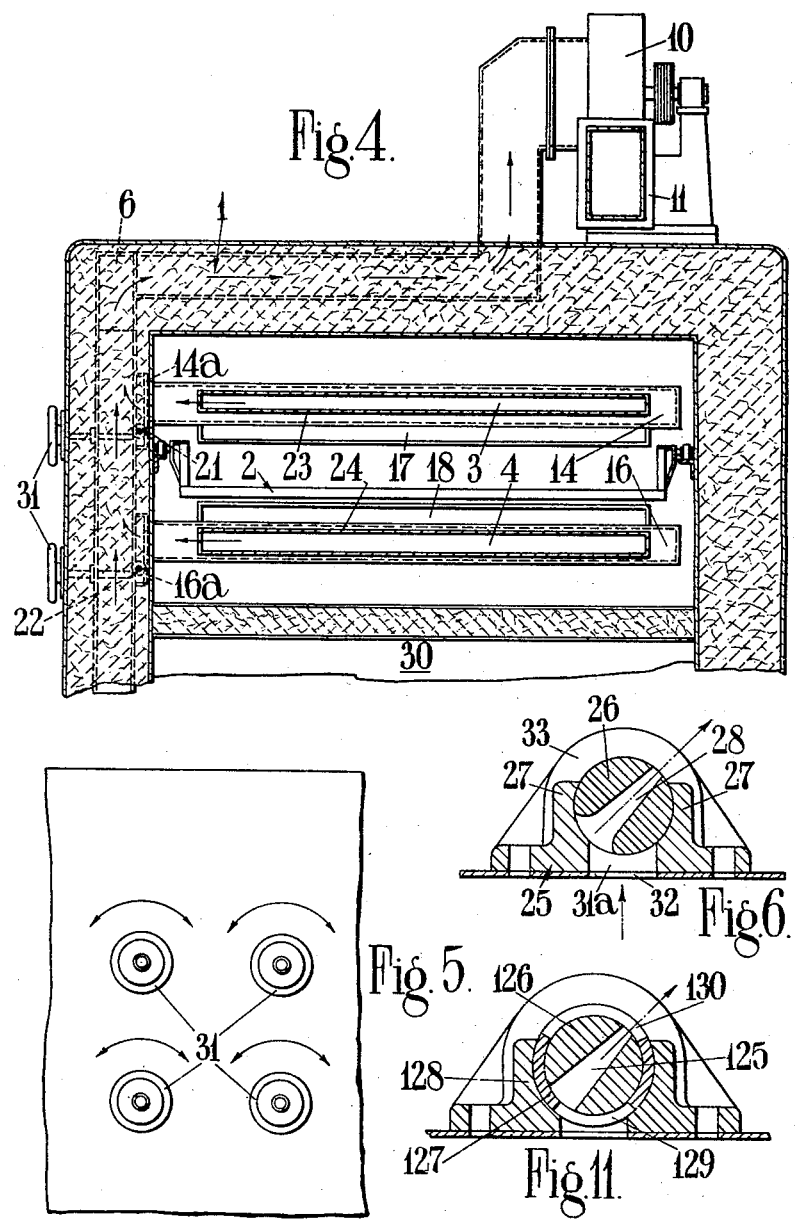

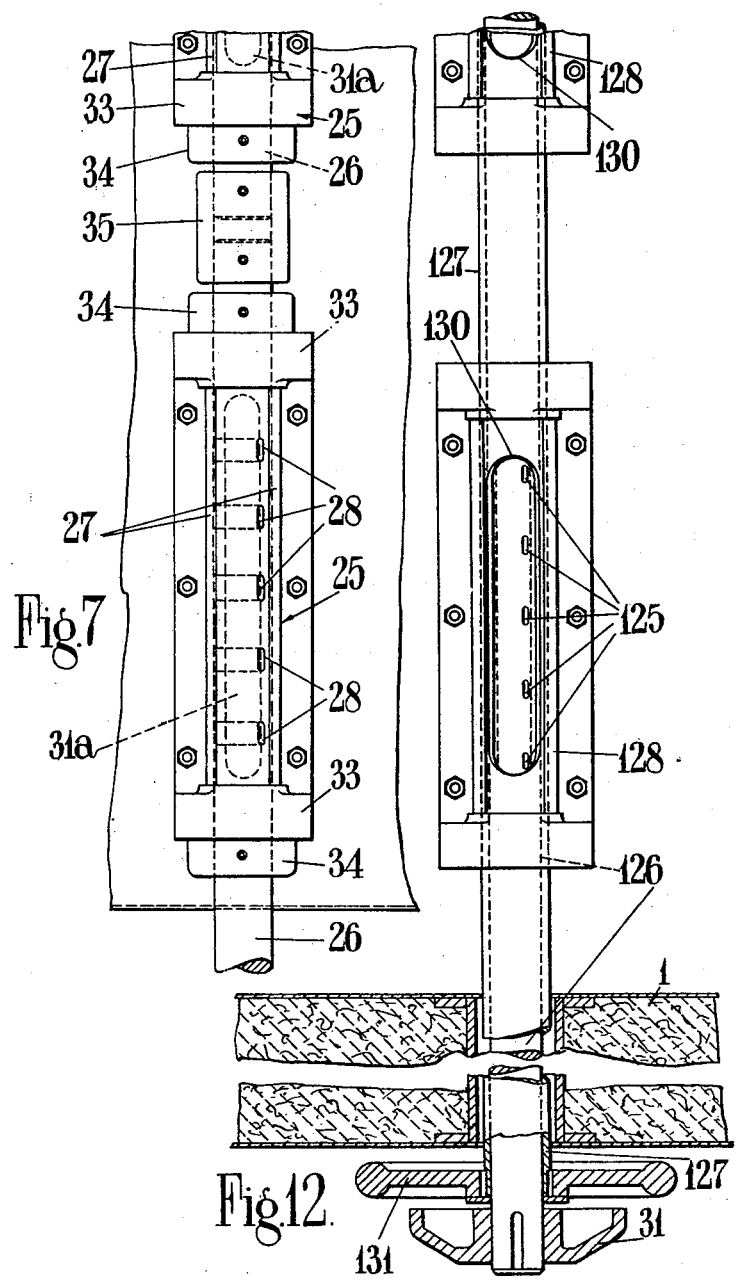

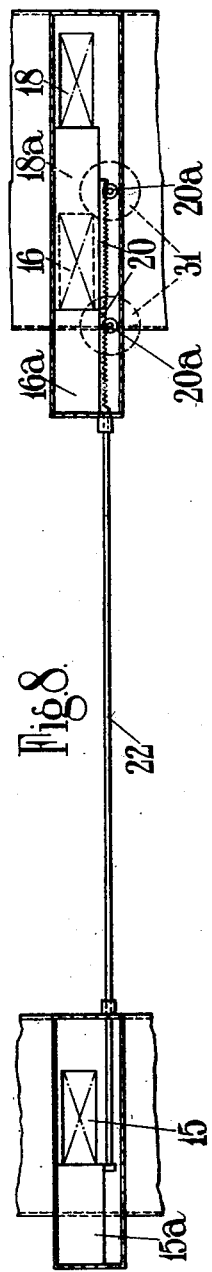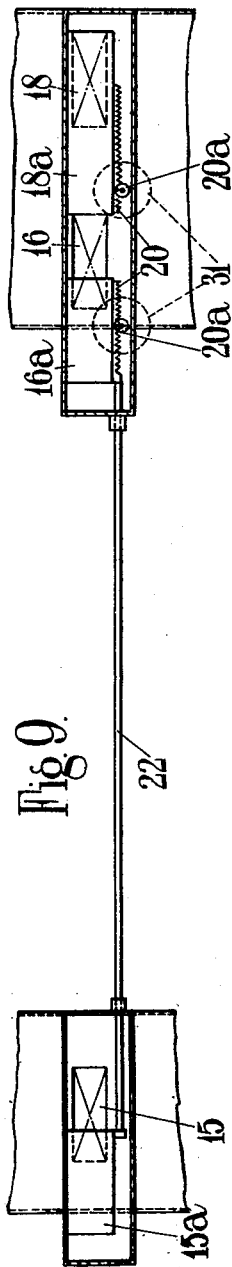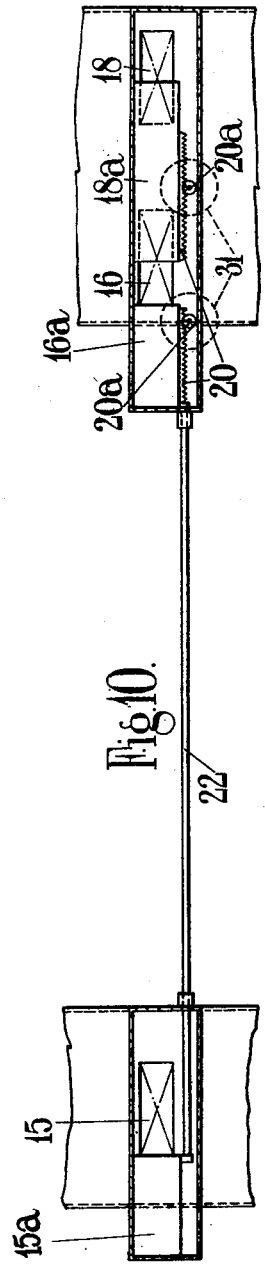

Patented July 22, 1952

2,604,059

UNITED STATES PATENT OFFICE 2,604,059

BAKER'S AND LIKE OVEN

James Irvine Dudley Warrington, Peterborough, England, assignor to Baker Perkins Incorporated, Saginaw, Mich.

Application May 31, 1949, Serial No. 96,294
In Great Britain June 11, 1948

5 Claims. (Cl. 107—55)

This invention relates to bakers' and like ovens operating on the system known as "cyclotherm" in the trade, wherein the baking heat is derived from combustion gases of a gas or oil burner circulated by fan means through radiator conduits in but not open to the oven. In such ovens the goods are baked under the influence of heat radiated from said conduits or of convection heat derived from contact of the oven atmosphere with said conduits.

The object of the present invention is to provide variations in the kind of baking conditions to which the goods may be subjected according to their nature and to enable suitable conditions to be imposed in various parts of the oven and such that where travelling ovens are concerned the goods may be successively passed through zones in which appropriate baking conditions exist to produce the desired result, an aim of the invention being to provide alternatives such that the goods may be subjected to radiant heat treatment as at present known or baking mainly under the influence of free flow of circulating or turbulent gases in contact with the goods, or if desired a combination of radiation and circulation in variable proportions.

The invention consists in an oven of the character indicated wherein the radiator conduits (or certain of them) are provided with a series of nozzles or vents for admitting gases from the conduits into the oven chamber and wherein means are provided for diverting some or all of the radiator conduit gases from their normal closed path of circulation to cause such to enter the oven through the nozzles or vents and for drawing exhausting oven atmosphere gases from the oven chamber back into the circulating system to accord with the gases entering through the nozzles or vents.

The invention further consists in an oven having the features indicated in the preceding paragraph comprising a suction box to which the radiator conduits are connected having an exhaust opening to the oven chamber and valve or damper means for said opening, and for controlling gases passing from the radiator conduits to said suction box, whereby variable quantities of oven atmosphere and gases may be withdrawn and the pressure in the radiator conduits can be controlled for varying the quantity of gases injected through said nozzles.

The valve or damper means referred to above may be conveniently arranged so that as the suction box exhaust is opened to the oven chamber, the connection to the conduits is automatically closed.

A further aim of the invention is to provide in an oven of the character indicated, means for injecting hot gases into an oven of the character indicated in a manner controllable both as to direction and/or quantity.

The invention further consists of an oven of the character indicated or as above defined having radiator conduits provided with nozzle devices positioned transversely of the oven and rotatable about their transverse axis for varying the direction of the gases injected through the nozzles. In the preferred form the rotatable nozzles have a coaxial sleeve valve whereby the quantity of gases passing through the nozzles may be locally controlled.

In the accompanying drawings—

Figure 1 is a longitudinal section of a portion of a swinging tray oven,

Figure 2 is a sectional plan on the line 2—2 of Figure 1,

Figure 3 is an outside plan,

Figure 4 is a cross section on line 4—4 of Figure 2,

Figure 5 is a view of the damper control hand wheels,

Figure 6 is a cross section of a nozzle,

Figure 7 is a plan view of a part of a nozzle,

Figure 8 is a diagram showing the position of dampers for the bottom radiator and exhaust header as arranged for "direct circulation,"

Figure 9 is a similar diagram with the dampers arranged for "radiant heat," and

Figure 10 is a similar diagram with the dampers arranged for "combined radiant heat and direct circulation,"

Figures 11 and 12 are cross section and an elevation partly in section of a modified form of nozzle control.

In carrying the invention into effect according to one mode as described by way of example, a plurality or series of cyclotherm units of which one is shown in the drawings are arranged longitudinally in an oven 1, for example a travelling oven, the oven band or conveyor 2 of which runs between radiator conduits 3 and 4 which provide top and bottom heat. In each unit or section these conduits 3 and 4 extend between a pressure or delivery box 5 and a suction box or chamber 6, a gas or oil fuel burner or heater 7 being provided to supply products of combustion through a conduit 8 to a fan 9 discharging into the pressure box 5, while the suction box 6 is connected to a fan 10 which draws the products of combustion from the conduits 3 and 4 and returns them to the burner or heater 7 by the conduit 11. A vent 12 to atmosphere is provided, preferably in the conduit 11 between the burner 7 and the suction fan 10, for passing out of the circuit a proportion of the products of combustion equivalent to the gases introduced into the system by the burner or heater 7.

The radiator conduits 3 and 4 may be of elongated rectangular form in cross-section and lie horizontally between headers 13, 14 and 15, 16 which extend transversely of the oven and enter the delivery box 5 and suction box 6, respectively, the said boxes being preferably located towards one side of the oven. The connection between the headers 13, 14 and 15, 16 and their respective boxes 5 and 6 are controlled by dampers 13a, 14a, 15a and 16a so as to regulate the circulation through the radiator conduits.

The suction box 6 is in addition provided with exhaust header means or transversely extending branches 17 and 18 which open directly to the oven chamber 19, preferably through an elongated slot or mouth. One of such headers or branches 17 is provided in or about the horizontal plane of the top heat radiator conduit 3 and the other 18 is provided about the plane of the bottom heat radiator conduit 4. The connection of each of these headers 17 and 18 with the suction box 6 is provided with an exhaust damper 17a and 18a which is of such length that in opening to place the exhaust header or branch 17 or 18 in communication with the suction box 6, it extends over and correspondingly closes the adjacent connection of the radiator conduit headers 14 or 16 to the suction box 6. Means for operating the dampers 13a, 14a, 15a, 16a, 17a and 18a above described from the outside of the oven are provided. For example, rack and pinion mechanism 20, 20a may be employed for effecting their reciprocation by exterior hand wheels 31.

The dampers 13a, 15a of the pressure box 5 are preferably operatively connected by rods 21, 22 to the corresponding suction box dampers 14a, 16a so that they operate in unison.

The lower surface 23 of the top heat radiator conduit 3 and the opposed upper surface 24 of the bottom heat radiator conduit 4, are each provided with transverse nozzle devices 25 spaced apart longitudinally. These nozzle devices 25 communicate with their respective radiator conduits 3 or 4 so that a proportion of the products of combustion circulating through the radiator conduits may under certain conditions be blown into the oven chamber 19. Each nozzle device, see Figures 6 and 7, comprises a cylindrical member or bar 26 mounted for rotation (about an axis transverse to the oven chamber) in bearing-housing members 27 secured on the radiator conduit. Each of these cylindrical members or bars is traversed diametrically by an elongated nozzle slots or a series of nozzle slots, passageways or bores 28 in communication with apertures or a chamber 31a in the bearing member 27 which registers with an aperture 32 in the radiator box. The discharge ends of the nozzle slots 28 inject the products of combustion into the oven chamber 19. The nozzle bars 26 are mounted for rotation in end bosses 33 of the bearing members 27, collars 34 preventing endwise movement. The ends of adjacent nozzle bars 26 are secured together by a muff coupling 35.

Means 29 are provided exteriorly of the oven and coupled to an end cylindrical nozzle device 25 for partially rotating such about its axis to direct the injected air forwardly, that is to say in the direction in which the goods are travelling on the oven band 2, or rearwardly, or in any intermediate position. The rotation also effects valvular control by an appropriate movement relatively to the bearing 27.

In order to control the amount of air discharged from the radiators the nozzles 125, Figures 11 and 12, may be formed in a single rod 126 extending across the oven and be mounted for rotation in a sleeve 127 which is seated in the bearing-housing elements 128. This sleeve is provided with arcuate openings 129 which control the rear end of the nozzle openings 125; arcuate openings 130 are also provided to allow a free passage for the gases issuing from the nozzle. This sleeve has openings 129 that form valves for the nozzles and is provided with a hand wheel 131 exterior to the oven whereby the sleeve may be rotated relative to the nozzle rod 126 to open and close the rear entry of their nozzles 125.

By means of the sleeve valve 127 the amount of gases flowing through the nozzles may be controlled for varying inclination of the nozzles, as distinguished from the embodiment illustrated in Figs. 6 and 7.

In operation of the oven, for affording radiant heat alone the nozzle devices 25 are closed down and the radiator conduit headers 3 and 4 have their dampers 13a, 14a, 15a, 16a open to the required degree to allow products of combustion to pass from the pressure or delivery box 5, through the radiator conduits into the suction box 6 and return to the burners 7 in a so-called closed circuit, see Figure 9. Under these conditions the exhaust headers 17, 18 which communicate with the oven chamber 19, have their dampers 17a, 18a closed so that none of the oven atmosphere will be drawn into the suction box 6.

When it is desired to carry out a baking operation in a circulating atmosphere all or a selected number of the nozzle devices 25 are adjusted so that they inject products of combustion in a selected direction or directions and their bores 28 are adjusted to pass the products of combustion through at the required rate.

The exhaust dampers 17a, 18a are opened fully or as required and the conduit header dampers 13a, 14a, 15a, 16a are correspondingly closed, see Figure 8, which may be effected as already indicated automatically with the opening of the exhaust dampers 17a, 18a. According to this arrangement the circulation through the conduits 3 and 4 is throttled and the whole (or a proportion) of the gases passing will be diverted through the nozzles 25 and as a consequence a circulating or turbulent atmosphere will be created within the oven chamber 19. The exhaust dampers 17a, 18a being open the oven atmosphere will be drawn upon and gases will be extracted from the oven atmosphere at the suction box 6 and carried into recirculation. This operation may be carried out in respect to both the top and bottom heat conduits 3 and 4 or to one or the other so that products of combustion are blown into the oven from the top or bottom radiator conduit nozzles 25 as selected while the other is functioning for radiant heat.

According to a further alternative the damper adjustments may be made and the nozzles adjusted so that both the top and bottom heat radiator conduits 3 and 4 supply a combination of radiant heat and injected products of combustion, see Figure 10.

It will be seen that the various sections of the oven can thus be provided with the quantity and quality of heat desired for the particular baking conditions required in the various zones, either by utilising radiant heating alone, injection heating alone or by a combination of injection and radiation; further, that in each section the injection of products of combustion can be flexibly regulated by adjusting the valve controls for the nozzles and/or the direction thereof.

Instead of the swinging tray conveyor 2 shown, a steel band or other known type of travelling oven conveyor may be employed.

Similar oven atmosphere and heating control may be employed in the lower baking chamber 30 or chamber for the return lap of the oven conveyor.

I claim:

1. In an oven chamber having top and bottom radiator conduits each connecting a pressure box with a suction box and circulating means for supplying and regulating flow of hot combustion products through said conduits and boxes; spaced nozzle devices provided on opposed faces of said conduits for discharging such products into the oven chamber; each nozzle device comprising a fixed bearing-housing, a chamber in said bearing-housing in communication with said radiator conduit; a bar mounted in said bearing-housing and rotatably adjustable about its axis; said bar having passageways therethrough for varying valvular distribution and directional control of flow of said combustion products into and throughout said oven chamber.

2. In an oven chamber having top and bottom radiator conduits each connecting a pressure box with a suction box, circulating means for supplying and regulating flow of hot combustion products through said conduits and boxes; nozzle devices disposed transversely of the oven chamber and spaced apart on opposed faces of said conduits for discharging the said products into the oven chamber; each nozzle device comprising a fixed bearing-housing formed with a chamber in communication with said radiator conduit; a bar rotationally adjustable about its axis, mounted in said bearing-housing and having transverse passageways therethrough for valvular distribution and directional control of the flow of combustion products into and throughout said oven chamber.

3. In an oven chamber having top and bottom radiator conduits each connecting a pressure box with a suction box and having circulating means for supplying and regulating flow of hot combustion products through said conduits and boxes; spaced nozzle devices provided on opposed faces of said conduits for discharging said products into the oven chamber; each nozzle device comprising a fixed bearing-housing, a chamber in said bearing-housing that communicates with said radiator conduit; a sleeve rotatable in said bearing-housing; diametrically opposed arcuate valve openings in said sleeve; a bar mounted for adjustable rotation in said sleeve; and means for adjustably rotating the bar and sleeve relatively to each other; said bar having passageways therethrough for valvular distribution and directional control of the flow of combustion products into and throughout said oven chamber.

4. In an oven chamber having top and bottom radiator conduits each connecting a pressure box with a suction box, circulating means for supplying and regulating flow of hot combustion products through said conduits and boxes; transverse nozzle devices spaced apart longitudinally on opposite faces of said conduits for discharging such products into the oven chamber; each nozzle device comprising a fixed bearing-housing; a chamber in said bearing-housing that communicates with said radiator conduit; a sleeve rotatable in said bearing-housing; diametrically opposed arcuate valve openings in said sleeve; a bar mounted for adjustable rotation in said sleeve; and means for adjustably rotating the bar and sleeve relatively to each other; said bar having passageways therethrough that provide directional control and valvular distribution of the flow of combustion products into and throughout said oven chamber.

5. In an oven chamber having top and bottom radiator conduits each connecting a pressure box with a suction box, circulating means for supplying and regulating flow of hot combustion products through said conduits and boxes; spaced nozzle devices provided on opposed faces of said conduits for discharging such products into the oven chamber; each nozzle device comprising a fixed bearing-housing, a chamber in said bearing-housing that communicates with said radiator conduit; a bar mounted in said bearing-housing and rotationally adjustable about its axis, said bar having passageways therethrough that provide valvular distribution and directional control of the flow of combustion products into and throughout said oven chamber; means for exhausting combustion products from the oven chamber, said means comprising an exhaust header branch in communication with the oven chamber and suction box; an exhaust damper at said suction box for controlling flow of said products alternately through either said radiator conduit or said exhaust header branch; and adjustment means for regulating said exhaust damper.

JAMES IRVINE DUDLEY WARRINGTON.

REFERENCES CITED

The following references are of record in the file of this patent:

UNITED STATES PATENTS

| Number | Name | Date |
|---|---|---|
| 2,002,976 | Byron | May 28, 1935 |